United States Patent
Chang et al.

[11] Patent Number: 5,941,948
[45] Date of Patent: Aug. 24, 1999

[54] ADMISSION CONTROLLER FOR NETWORK ACCESS

[75] Inventors: An-Bang Chang, Taichung; Tsern-Huei Lee, Hsinchu; Jinshuan Eric Lee, Taipei; Kuen-Rong Hsieh; Yih-Woei Liang, both of Hsinchu, all of Taiwan

[73] Assignee: Industrial Technology Research Institute, Hsinchu, Taiwan

[21] Appl. No.: 08/959,872

[22] Filed: Oct. 29, 1997

[51] Int. Cl.[6] ................................................ G06F 13/14
[52] U.S. Cl. ................................................................ 709/225
[58] Field of Search ........................ 364/DIG. 1 MS File, 364/DIG. 2 MS File; 709/104, 200, 203, 219, 220, 221, 223, 225, 226, 227, 228, 229, 232, 249, 250

[56] References Cited

U.S. PATENT DOCUMENTS 5,528,513  6/1996  Vaitzblit et al. .......................... 395/673
5,742,772  4/1998  Sreenan .............................. 395/200.56

*Primary Examiner*—Robert B. Harrell
*Attorney, Agent, or Firm*—Proskauer Rose LLP

[57] ABSTRACT

The present invention discloses a network access admission controller and the method used to determine its schedulability. The basic principle involves determining, for all the connections to be checked, if there is any time slot, among all the time slots within a cycle, that will satisfy the scheduling property without the possible misjudgment of schedulability found in the conventional technology. The inventive method of determining schedulability makes its judgment based on packets issued by all the connections and on each of these connections individually. In particular, a determination is made regarding whether there is a particular time slot, among all the time slots, corresponding to the cycle of connection under evaluation, such that all the time slots prior to it are capable of processing the previously issued packets from the connections having higher priority than this particular time slot. When the connections all have a time slot that satisfies the above conditions, a connection is determined to be schedulable. However, when any of the connections fail to have a time slot that satisfies the above conditions, a connection is determined not to be schedulable.

13 Claims, 2 Drawing Sheets

ADMISSION CONTROLLER FOR NETWORK ACCESS

FIELD OF THE INVENTION

The present invention relates to an admission controller for controlling network access and the method of controlling such an access. In particular, it relates to an admission controller that ensures, in a communications system with limited resources, that all admitted communication requests are processed within minimum quality of service (QoS) criteria, and to the method of determining the schedulability used by the admission controller.

BACKGROUND OF THE INVENTION

In a system that shares resources, there is at least one server end to provide service and a plurality of client ends which selectively receives such services. A client end receives such services by transmitting a request, having the appropriate protocol, to the server end for accessing the resources provided by the system, over, e.g., a shared communication channel in a network system. For example, a media-on-demand network system may comprise a media server connected to a plurality of clients over a shared transmission medium.

Of course, a system with shared resources has an inherent limit on the services it provides. For example, when there are too many communication requests in the system, not all of the requests submitted by the clients can be satisfied. This is especially true when the received communication requests require a minimum quality-of-service (QoS) criteria or support real time communication services. That is, for a server to support real-time media, the server typically integrates various types of QoS criteria within one system framework. For example, in an asynchronous transfer mode (ATM) system, the QoS sets the tolerances, i.e., performance requirements, for the data packet cell loss ratio, the cell transfer delay, and the delay jitter.

Accordingly, to provide for such QoS and real time communication services, an admission controller may be provided to allocate the system's limited resources efficiently. In other words, the purpose of an admission controller is to ensure that the system can provide the appropriate QoS criteria to all the admitted requests, i.e., received requests having the correct protocol. The admission controller can check all the requests in the system to ensure that all requests receive the predefined quality of service criteria. In addition, the admission controller can check each admitted request to determine if it will have a so called "pushing effect" on the existing requests which might affect their QoS. In terms of actual application, as long as the admission controller checks every newly submitted request from the time the system starts, it can be ensured that all the admitted requests will be within the minimum QoS criteria.

The operation of the admission controller can be best described with reference to FIG. 1. FIG. 1 shows a constant bit rate system (CBR) which uses evenly divided slots as its transmission method to transmit fixed length packets. In FIG. 1, there are m number of users who share one resource item z, with an admission controller 5 controlling and assigning the slots to each user. However, the priority of each connection must be determined using, for instance, a rate monotonic algorithm which follows static priority assignment rules. This assignment rule is described as follows. When $D_i \leq D_j$, the priority of the $i^{th}$ connection is greater than the priority of the $j^{th}$ connection. Here, $D_i$ stands for the cycle of the refers to the number of time slots that has to pass before a fixed length packet is sent out by the $i^{th}$ connection in a continuous time slot system. For instance, when the cycle of the $i^{th}$ is 4, it means that this connection will send out a fixed length packet every 4 time slots. The rate monotonic rule mentioned hereinabove can be simply described as follows the greater the cycle of a connection is, the lower its priority will be; the smaller the cycle of a connection is, the higher its priority will be. In FIG. 1, if the connections are assumed to have been arranged in order of the cycles, all the connections can be presented as:

$$D_1 \leq D_2 \leq \ldots \leq D_m.$$

In the system, if the packet issued by a connection can be served before the next packet arrives, then the current system is then capable of accepting requests of all connections $D_1$–$D_m$. When the system is capable of accepting requests from all connections, the system is said to be "schedulable". This schedulability can thus be used by the network access admission controller in determining if the system can provide real time service to all current and newly admitted connections. The relationship between schedulability and admission control can be described as follows. If a request for a new connection is received and it is determined that the new connection plus all current connections can still meet the requirements of schedulability (defined above), then the admission controller can accept the request of this new connection because the packets issued by all the connections will be processed before the next packet is sent out, in which situation real time transmission is made possible. On the other hand, when schedulability is not possible, the admission controller indicates that some connections will be affected by the admission of the new connection. In other words, the connections will not receive the required service standard and the admission controller therefore will reject the request of this new connection. In short, the basic rule of determination used by the admission controller is the schedulability of a connection.

The method of determining the schedulability of the requests is to allow all the connections send out their request packets simultaneously. The rule of determining the schedulability is as follows. $D_{1, \ldots, m}$ is schedulable if and only if packet $P_k$ will be served no later than the $D_k^{th}$ time slot, where $1 \leq k \leq m$.

In other words, when all the connections send out a packet simultaneously, any one of these packets must be processed with in the cycle of its corresponding connection (namely before the next packet is issued). If this limit is crossed, there is clearly an indication that the requirements cannot be satisfied when the system is at its maximum capacity (namely, when all the connections sere not schedulable).

To implement the rule of determination described hereinabove, it is necessary to convert it to some quantifiable format that can be used in actual applications. In U.S. Pat. No. 5,528,513 entitled, "Scheduling and Admission Control Policy for a Continuous medai Server" by Vaitzblit et al and in IEEE Infocom '96 article entitled, "Traffic-Controlled Rate-Monotonic Priority Scheduling of ATM Cells" by Seok-Kyu and Kang G. Shin, for instance, this rule of determination is essentially converted to:

$$D_{1,\ldots,m} \text{ is schedulable "if and only if"} \sum_{j=1}^{i} \left\lceil \frac{D_i}{D_j} \right\rceil \leq D_i, \forall i, 1 \leq i \leq m,$$

where $\lceil x \rceil$ represents the smallest integer greater than or equal to x.

Using this rule of conventional admission control, correct schedulable can be determined in most cases. However, the "if and only if" condition in the above rule does not always work. Therefore, a wrong determination is possible under certain circumstances. The following example is cited to show a situation where the system is schedulable although it is determined otherwise using the conventional rule of determination for schedulability previously described.

In this example, the number of connections is 4, and the cycles of a ll connections are $D_{1 \ldots 4}=[4,4,4,5]$. When the conventional rule of determination is used to determine the schedulability of the $4^{th}$ connection (its cycle equals 5), the result is:

$$\sum_{j=1}^{4}\left\lceil\frac{D_4}{D_j}\right\rceil = 7 > 5.$$

This result indicates that the system is not schedulable according to the conventional rule of determination. However in reality, this system is schedulable as confirmed by the rate monotonic rule of assignment described below.

FIG. 2 illustrates the schedulability of the system with the cycles of $D_{1 \ldots 4}=[4,4,4,5]$ using the rate monotonic rule of assignment. In this figure, the communication channels of the system are simulated to be the continuous time slots S1–S17 The cycles of the first, the second, and the third connections all have a cycle of 4 for the packets which are represented by the symbols of a, b, and c respectively. The cycle of the packet by the fourth connection is 5 and the packet is represented by the symbol of d.

It is assumed that all the connections issue their packets simultaneously before the time slot S1. During time slot S1, the smaller the cycle is, the higher its priority will be, according to the rule of assignment. Thus, packet a issued by the first connection is processed in time slot S1. Similarly, packets b and c issued by the second and the third connections are processed in time slots S2 and S3. By this time, all the packets issued by the connections from the first to the third which have higher priorities have been processed already so that time slot S4 can now process the fourth connection which has a lower priority. At this time, all packets have been processed, which fact indicates that the system meets the description of the most basic format of schedulability. In other words, the system is schedulable. However, using the extensions described in the U.S. Pat. No. 5,528,513, the system cannot be correctly determined as schedulable, and accordingly, the conventional technology may generate incorrect determinations.

The actual determination according to the conventional rule of schedulability is directed toward each connection to determine if a packet can be inserted in the last time slot within a cycle. However, in the above-mentioned example, the fourth connection cannot possibly inset any packet in time slot S5 because new packets have already been issued by the first to the third connections and the packet issued by the fourth connection is inserted in the unused time slot S4 to complete the scheduling process. Thus, it is desired to establish a new rule of schedulability to determine if all the connections are schedulable and if the system can still maintain its property of schedulability, via an admissions controller, when a new connection is introduced. On the other hand, a new rule of detection must avoid the errors found in the conventional technology and able to detect all of the time slots. It is also desired to have a simplified computing process for an admission controller which will detect all of the time slots in a given cycle.

Accordingly, it is an object of the present invention to accurately determine the schedulability for network access, while determining the schedulability for connections to efficiently utilize the resources provided by the system.

Another object of the present invention is to include an admission controller that accurately determines the schedulability for network access.

Various other objects, advantages and features of the present invention will become readily apparent from the ensuing detailed description and the novel features which will be particularly pointed out in the appended claims.

SUMMARY OF THE INVENTION

These and other objectives are realized the present invention. Specifically, the present invention discloses a network access admission controller and the method used to determine its schedulability. The basic principle involves determining, for all the connections to be checked, if there is any time slot, among all the time slots within a cycle, that will satisfy the scheduling property without the possible misjudgment of schedulability found in the conventional technology. The inventive method of determinism by all the connections and on each of these connections individually. In particular, a determination is made regarding whether there is a particular time slot, among all the time slots, corresponding to the cycle of connection under evaluation, such that all the time slots prior to it are capable of processing the previously issued packets from the connections having higher priority than this particular time slot. When the connections all have a time slot that satisfies the above conditions, a connection is determined to be schedulable. However, when any of the connections fail to have a time slot that satisfies the above conditions, a connection is determined not to be schedulable.

BRIEF DESCRIPTION OF THE DRAWINGS

The following detailed description, giving by way of example and not intended to limit the present invention solely thereto, will best be understood in conjunction with the accompanying drawings in which.

DETAILED DESCRIPTION OF THE PREFERRED EMBODIMENTS

Figure 1:
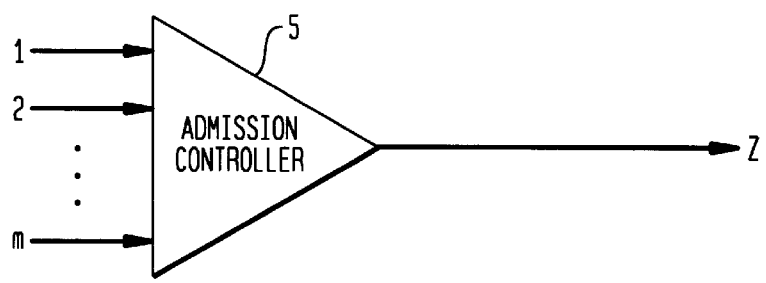
FIG. 1 illustrates a multi-user constant bit rate system.
Figure 2:
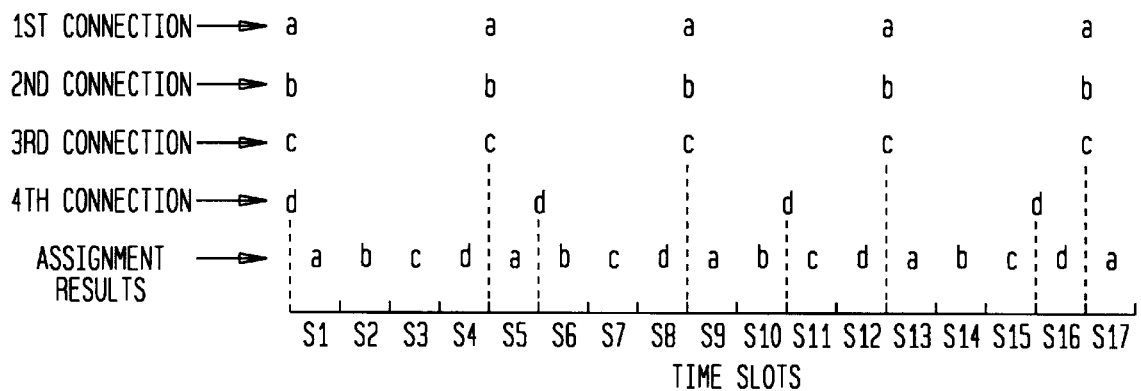
FIG. 2 illustrates the schedulability of the cycles $D_{1 \ldots 4}$ of a system using the rate monotonic rule of assignment.

The rule of determining the schedulability used by the admission controller for network access in the present invention applies to all the connections to be checked to accurately determine if there is any one time slot from all of the time slots, within the cycle, that will meet the requirement of schedulability. On the other hand, since the determination is calculated over every connection and every time slot, in a given cycle, the speed of computation will inevitably be reduced. To overcome this, the present invention further proposes a more simplified process whereby an architecture with a faster speed of processing schedulability is developed for actual use in production. The following will describe the method of determining schedulability and its hardware architecture in which the admission controller for network access determines whether to accept or to refuse any request for a new connection.

Since the conventional technology cannot detect all of the time slots, errors may occur. In the present invention, these errors are eliminated. The standard in determining schedulability is set forth as follows. Only when there exists a time slot within its cycle (namely, before the next packet is issued) that is capable of processing packets issued simultaneously by the other higher priority connections, can it then be called schedulable. Thus, the correct calculation method equivalent to the basic rule determining schedulability is as follows:

$D_{1\ldots m}$ is schedulable if and only if $\exists\ f_k$, so that $1 \leq f_k \leq D_k$ and $$\sum_{j=1}^{k}\left\lceil\frac{f_k}{D_j}\right\rceil \leq f_k, \forall k, 1 \leq k \leq m. \quad (1)$$

In Equation (1), the logic symbol "$\exists$" means "if there exists one" and the logic symbol "$\forall$" means "for all". The method of determining schedulability according to equation (1) states that for the $k^{th}$ connection there is at least one $f_k$ between 1 and $D_k$ (the cycle of the $k^{th}$ connection) in the system with m number of connections (arranged in an ascending order of value in each cycle), so that the equation of $$\sum_{j=1}^{k}\left\lceil\frac{f_k}{D_j}\right\rceil \leq f_k$$

is valid. If all of the connections can find such $f_k$ then $D_{1\ldots m}$ is schedulable and the admission controller can accept the new requesting connection; otherwise, the admission controller has to reject the request of the new connection.

Using equation (1), it is possible to correctly determine the schedulability of the connections of the system. The following discussion will try to illustrate equation (1) using the example in which the conventional technology erred. In the following calculations, only the fourth connection (namely, the one with cycle value being 5) is discussed. In these calculations, k is 4, $D_k$ is 5, and all five situations are considered where the value of $f_k$ changes from 1 to 5 sequentially.

$$f_k = 1, \sum_{j=1}^{k}\left\lceil\frac{1}{D_j}\right\rceil = 4 > 1,$$

not valid.

$$f_k = 2, \sum_{j=1}^{k}\left\lceil\frac{2}{D_j}\right\rceil = 4 > 2,$$

not valid.

$$f_k = 3, \sum_{j=1}^{k}\left\lceil\frac{3}{D_j}\right\rceil = 4 > 3,$$

not valid.

$$f_k = 4, \sum_{j=1}^{k}\left\lceil\frac{4}{D_j}\right\rceil = 4 = 4\ (f_k),$$

valid.

$$f_k = 5, \sum_{j=1}^{k}\left\lceil\frac{5}{D_j}\right\rceil = 7 > 5,$$

not valid.

Therefore, in the situation wherein k=4, i.e., when $f_k$=4, it will meet the requirement of equation (1). Using the same method to check other values of k (k=1,2,3,5,), it is noted that the subject system having cycle numbers $D_{1\ldots 4}$=[4, 4,4,5] is correctly determined to be schedulable.

The actual principle in carrying out the determination in equation (1) is described as follows. The function value $$\left\lceil\frac{f_k}{D_j}\right\rceil$$

represents the number of packets issued by the $j^{th}$ connection before the $f_k^{th}$ number of time slot. Thus, the sum function on the left side of the equation represents the total number of packets issued by all the connections that have higher priority than that of the $k^{th}$ (including the $k^{th}$) connection before the $f_k^{th}$ time slot. Therefore, as long as this total number of packets is not larger than $f_k$, all packets that have already been generated (including that generated by the $k^{th}$ connection) will be processed. Accordingly, for each connection, as long as there is a specific time slot, among all the time slots, before the next packet is issued that will meet the conditions described hereinabove, the connection is schedulable. Otherwise, the connection is not schedulable.

However, it is very time-consuming and thus somewhat wasteful of the system resources if equation (1) is used to directly carry out the determination of schedulability. With respect to the conventional technology described above, since the determination is calculated once for each connection (from 1 to m), it is only necessary to execute the determination when a request for a new connection is recovered for m number of times. On the other hand, in the present invention, a determination is executed for a maximum number of $D_k$ times for each connection to ensure that a satisfying $f_k$ is found. In other words, the total number of executions is m x $D_k$. It is foreseeable that this process may eliminate possible errors of determination but there is a cost with respect to the efficiency and speed of the system. Therefore, equation (1) will be modified to increase the efficiency and speed of the system, while maintaining its accuracy.

First of all, an H(f) function can defined to replace the determination portion of the equation. H(f) is defined as follows:

$$H(f) = f - \sum_{j=1}^{m}\left\lceil\frac{f}{D_j}\right\rceil \quad (2)$$

Basically, the function of H(f) is defined according to the determination in equation (1). However, there is a difference in that the upper and the lower limit of the sum is from 1 to m (the total of connections), which indicates that the value of the function is the total number of packets generated by all the connections before the time slot f. Thus, the only difference between the two equations is the introduction of the total packets generated by the connections with lower priority. The total of the packets generated by the connections with lower priority is actually the number of connections with lower priority, because each connection can only generate at most one packet. Therefore, equation (1) can be converted to a first scheduling equation, according to the present invention, in the following format:

$D_{1,\ldots,m}$ is schedulable if and only if $\exists f_k$, $1 \leq f_k \leq D_k$, so that
$$H(f_k) \geq -m+k, \forall k, 1 \leq k \leq m \quad (3)$$

The principle of determination is described as follows. For each connection, it is determined whether, out of all the time slots from the first to the one corresponding to the connection under examination, there is any time slot that will satisfy the following condition: from the number of time slots starting with the first to a given time slot, the total number of packets issued by all the connections before the given time slot is subtracted and the result is either greater than, or equal to, the index value of the connection under examination (the number of time slots for a connecti on to send a fixed length packet) minus the total number of the connections. When all the connections contain a time slot that satisfies the above-described condition, a new connection is schedulable; when there is any connection that cannot satisfy this condition, a new connection is not schedulable. Determination equation (3) is substantially equivalent to equation (1), and is therefore an accurate scheduling method.

Since the right side of equation (3) is a negative number, it is difficult for the hardware to process. Thus, H(f) is defined with the following function:

$$G(f) = H(f) + m \quad (4)$$

Thus, a second scheduling equation, in accordance with the present invention, can be converted as follows based on equation (4):

$D_{1,\ldots,m}$ is schedulable if and only if $\exists f_k$, $1 \leq f_k \leq D_k$, so that
$$G(f_k) \geq k, \forall k, 1 \leq k \leq m. \quad (5)$$

In equation (5), k is the index value of the connection under examination. From the description given herein, the value of k also indicates a descending order of priority, from high to low. For connections having the same number of cycles, if the connection with the lowest priority satisfies the condition of schedulability, then all the other connections having the same number of cycles will satisfy this condition as well. On the other hand, for the connection of the lowest priority having the same number of cycles, the value of k also indicates number of connections with cycles smaller than, or equal to, $D_k$. Thus, equation (5) can be converted to the following format:

$D_{1,\ldots,m}$ is schedulable if and only if $\exists f$, $1 \leq f \leq D_k$, so that
$$\max_{1 \leq f \leq D_k} G(f) \geq \sum_{f=1}^{D_k} N(f), \forall k, 1 \leq k \leq m. \quad (6)$$

Here, N(f) stands for the number of connection with f cycles. Equation (6) is the third scheduling equation in accordance with the present invention.

The scheduling methods as described in equations (3), (5) and (6) can all be implemented through hardware in accordance with an embodiment of the present invention.

However, taking into account calculation speed and other factors, an admission controller implemented using equation (6) is the preferred embodiment of the present invention. The following is an explanation of the admission controller implemented using equation (6). However, this is not to limit the scope of the present invention; for those who are well versed in this technology, an admission controller implemented through other methods can also be easily obtained using the technique disclosed herein without departing from the spirit and the scope of the present invention.

First of all, in equation (6), the function G(f) can be modified according to its definition when a new connection is admitted or when an existing connection departs, to arrive at a new value G'(f):

$$G'(f) = G(f) - \left\lfloor \frac{f-1}{D} \right\rfloor \quad \text{(When a new connection is admitted)} \quad (7)$$
$$= G(f) + \left\lfloor \frac{f-1}{D} \right\rfloor \quad \text{(When an existing connection departs)}$$

Here, D stands for the cycle of the connection that is to be admitted or that which is to depart, the function "$\lfloor x \rfloor$" indicates the largest integer that is smaller than, or equal to, the value inside the function. As for N'(f), which is the modified form of N(f), it is the function f plus or minus 1 corresponding to the cycle of the connection to be admitted or the connection that is to depart. From equations (6) and (7), the admission controller can decide if a new connection is acceptable by determining if all of the connections are still schedulable after the new connection is admitted.

Figure 3:
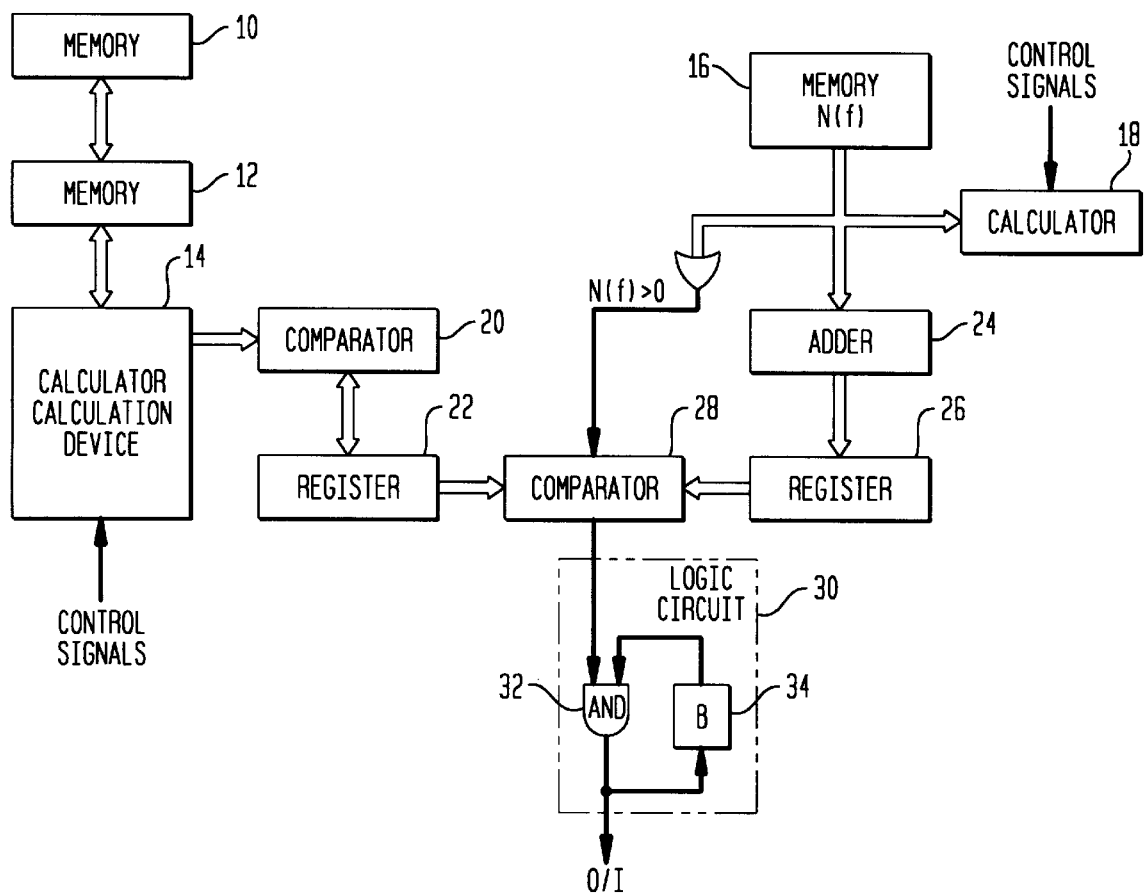
FIG. 3 schematically illustrates the architecture of the admission controller that determines whether to accept or to reject a new connection in accordance with the present invention.

FIG. 3 is the hardware architecture for the inventive admission controller deciding whether to accept or to reject a request from a new connection. FIG. 3 includes a first memory device 10 that calculates the maximum value of the modified G'(f), a second memory device 12, a first calculation device 14, a first comparator 20 and a first register 22. In addition, FIG. 3 includes a third memory device 16 that calculates the accumulated value of the modified N'(f), a second calculation device 18, an adder 24, and a second register 26. The maximum value of G'(f) and the accumulated value of N'(f) are then processed by a second comparator 28 and by a logic circuit 30 to determine if a new connection is to be accepted or rejected. Logic circuit 30 includes an AND gate 32 and a buffer 34.

First memory device 10 is used to store the original value of function G(f). Second memory device 12 is used to store the same value as that of first memory device 10 before any new connection is admitted or any existing connection departs. When a new connection is admitted or an existing connection departs, second memory device 12 stores the all the values of the modified G'(f) calculated by first calculation device 14. In the situation when an existing connection departs, the value of the modified G'(f) can be stored directly first in memory device 10 since the QoS of tbe admitted, whether or not the value of the modified G'(f) is to be stored in first memory device 10 depends on the determination of whether the new connection is to be admitted or rejected.

First calculation device 14 is used to decide how to modify the function value of G(f) according to the control signals. The control signals can indicate the admission of a new connection or the removal of an existing connection. First calculation device 14 then uses equation (7) to adjust and generate the modified G'(f). In the preferred embodiment of the present invention, when the situation of a new connection occurs, first calculation device 14 sequentially subtracts 1 from the original value of function G(f) corresponding to cycle f, using the cycle of the new connection as the trigger cycle, to modify and generate the function value of G'(f) described hereinabove. Conversely, when the situation of removing an existing connection occurs, first calculation device 14 sequentially adds 1 to the original value of function G(f) corresponding to cycle f, using the cycle of the departing connection as the trigger cycle, to modify and generate the function value of G'(f), as shown in equation (7).

First comparator 20 and first register 22 are used as the comparator for the maximum value of the modified function G'(f). Specifically, first register 22 is used to store temporarily the maximum value of modified function G'(f) during the comparison. For any connection under examination, parameter f is any number between 1 and $D_k$, as indicated in equation (6). In this range, the modified function G'(f) corresponding to the value of f is generated sequentially by first calculation device 14. First comparator 20 compares the newly generated modified function G'(f) with the maximum value of the function previously generated (and stored in first register 22), and stores the greater of the two in first register 22 until the maximum value is generated. At this time, the output of first register 22 is the left part of equation (6).

Third memory device 16 is used to store the function value N(f) which is updated through second calculation device 18. Second calculation device 18, similarly, uses the control signals that indicate either a new connection or a connection to be removed. When the situation of a new connection occurs, second calculation device 18 adds 1 to the function N(f) of the value of f that corresponds to the cycle of the newly admitted connection so as to modify and generate the function of N'(f). Conversely, when the situation of removing an existing connection applies, second calculation device 18 subtracts 1 from the function N(f) of the value of f that corresponds to the cycle of the departing connection so as to modify and generate the function of N'(f). Adder 24 and second register 26 are used as an accumulator that calculates the accumulation value of the modified function N'(f) of the parameter f between 1 and $D_k$ (the cycle of the connection under examination) and sends it to second comparator 28.

Second comparator 28 performs the function of comparison only under the condition when N(f) is greater than 0, that is,t a connection cycle f (i.e., N(f)>0). When second comparator 28 detects that the value from first register 22 (the maximum value of G'(f)) is greater than the value sent out by second register 26 (the accumulated value of N'(f)), it sends out a binary 1. Conversely, when the value from first register 22 is smaller than the value sent out by second register 26, it sends out a binary 0. Logic circuit 30 decides whether to accept or to reject a new connection according to the value sent out by second comparator 28. Here, AND gate 32 and buffer 34 can form a sequential AND gate, that is, logic circuit 30 will only output a binary 1 (indication to accept) when the logic value resulting from examination of each connection is binary 1, but if the logic value resulting from examining any one connection is binary 0, logic circuit 30 will output a binary 0 (indication to reject). Thus, the admission controller can make a correct determination whether to accept or reject a new connection based on this information.

Finally, the above-discussion is intended to be merely illustrative of the invention. Numerous alternative embodiments may be devised by those having ordinary skill in the art without departing from the spirit and scope of the following claims.

What is claimed is:

1. A method of determining the schedulability in a network access service system to determine whether multiple connections are schedulable, said network access service system being divided into multiple time slots to provide network access service for said connections, wherein each said connection has a corresponding index value, representing the number of time slots needed for a respective connection to issue a fixed length packet, said index values arranged in ascending order of priority, and wherein said determination being based on said packets issued by said connections before a starting time slot and based on said time slots from a starting time slot to a time slot corresponding to the cycle of a selected connection under examination, said method comprising the steps of:

calculating, for each of said time slots within said cycle, whether the total number of said time slots from said starting to the selected time slot minus said number of said packets issued by said connections is greater than or equal to the index value of said selected connection less the total number of said connections; and indicating that all of said connections are schedulable if one of said time slots within said cycle satisfies the calculation, and indication that all of said connections are not schedulable otherwise.

2. A method of determining the schedulability of claim 1, further comprising the step of adding a new connection to said multiple connections, wherein said step of calculating calculates whether all of said connections including said new connection are schedulable.

3. The method of determining the schedulability of claim 2, wherein the step of indicating is based on whether there is a time slot $f_k$ that can satisfy the following equation:

$$H(f_k) \geq -m+k, \ 1 \leq f_k \leq D_k, \ 1 \leq k \leq m,$$

where $$H(f) = f - \sum_{j=1}^{m} \left\lceil \frac{f}{D_j} \right\rceil,$$

and wherein m represents said total the number of said connections, k represents the connection under examination, Dk represents the cycle of said connection under examination, and $D_j$ representing the cycle of the $j^{th}$ connection.

4. The method of determining the schedulability of claim 2, wherein determination of is based on whether there is a time slot $f_k$ that can satisfy the following equation:

$$G(f_k) \geq k, \ 1 \leq f_k \leq D_k, \ 1 \leq k \leq m,$$

wherein $$G(f) = f - \sum_{j=1}^{m} \left\lceil \frac{f}{D_j} \right\rceil + m,$$

and wherein m represents said total number of said connections, k represents the connection under examination, Dk represents the cycle of said connection under examination and $D_j$ represents the cycle of the $j^{th}$ connection.

5. A method of determining the schedulability of claim 2, wherein the determination of these connections is based on whether there is a time slot f that can satisfy the following equation:

$$\max_{1 \leq f \leq D_k} G(f) \geq \sum_{j=1}^{D_k} N(f), 1 \leq f \leq D_k, 1 \leq k \leq m,$$

$$\text{wherein } G(f) = f - \sum_{j=1}^{m} \left\lceil \frac{f}{D_j} \right\rceil + m,$$

and wherein N(f) represents the number of connections with cycle f, m represents the number of said connections, k represents the connection under examination, Dk represents the cycle of said connection under examination and $D_j$ represents the cycle of the $j^{th}$ connection.

6. The method of determining the schedulability of claim 1, wherein the step of indicating is based on whether there is a time slot $f_k$ that can satisfy the following equation:

$$H(f_k) \geq -m+k, 1 \leq f_k \leq D_k, 1 \leq k \leq m,$$

wherein $$H(f) = f - \sum_{j=1}^{m} \left\lceil \frac{f}{D_j} \right\rceil,$$

and wherein m represents said total number of said connections, k represents the connection under examination, $D_k$ represents the cycle of said connection under examination, and $D_j$ represents the cycle of the $j^{th}$ connection.

7. The method of determining the schedulability of claim 1, wherein step of indicating is based on whether there is a time slot $f_k$ that can satisfy the following equation:

$$G(f_k) \geq k, 1 \leq f_k \leq D_k, 1 \leq k \leq m,$$

wherein $$G(f) = f - \sum_{j=1}^{m} \left\lceil \frac{f}{D_j} \right\rceil + m,$$

and wherein m represents said total number of said connections, k represents the connection under examination, Dk represents the cycle of said new connection under examination, and $D_j$ represents the cycle of the $j^{th}$ connection.

8. The method of determining the schedulability of claim 1, wherein the step of indicating is based on whether there is a time slot f that can satisfy the following equation:

$$\max_{1 \leq f \leq D_k} G(f) \geq \sum_{f=1}^{D_k} N(f), 1 \leq f \leq D_k, 1 \leq k \leq m,$$

$$\text{wherein } G(f) = f - \sum_{j=1}^{m} \left\lceil \frac{f}{D_j} \right\rceil + m,$$

and wherein N(f) represents the number of connections with cycle f, m represents said total number of said connections, k represents the connection under examination, Dk represents the cycle of said connection under examination, and $D_j$ represents the cycle of the $j^{th}$ connection.

9. An admission controller for network access for use in a network access service system to determine if multiple connections are schedulable, said network admission service being divided into multiple time slots to provide network access service to said connections, respectively, said controller comprising:

a first memory device to store an original function value G(f), where $$G(f) = f - \sum_{j=1}^{m} \left\lceil \frac{f}{D_j} \right\rceil + m,$$

and wherein m represents said total number of connections, $D_j$ represents the cycle of the $j^{th}$ connection, and f represents an integer, a first calculation device to calculate a modified function value G'(f) when either a new connection is added or when an existing connection departs;

a maximum value comparator to extract the maximum value from said function value G'(f);

a third memory device to store the function value N(f), with N(f) representing the number of connections corresponding to cycle f among said connections;

a second calculation device to calculate the modified function value N'(f) when either said new connection is added or when said existing connection departs;

an accumulator to generate an accumulated value by adding said function values N'(f) corresponding to cycle f; and a decision device to compare the maximum value of said function value G'(f) with the accumulated value of said function value N'(f) for concluding that said new connection is acceptable when said maximum value is greater than its corresponding accumulated value for all of said connections, and that said new connection is not acceptable when said maximum value is smaller than its corresponding accumulated value for all of said connections.

10. The admission controller for network access of claim 9, wherein the first calculation device, triggered by a cycle of the new connection, subtracts 1 from the original function value G(f) sequentially during said cycle f, so as to generate said modified function value G'(f).

11. The admission controller for network access of claim 9, wherein the first calculation device, triggered by a cycle of the departing connection, adds 1 to the original function value G(f) sequentially during said cycle f, so as to generate said modified function value G'(f).

12. The admission controller for network access of claim 9, wherein the second calculation device adds 1 to the function value N(f) corresponding to cycle f, according to a cycle of the new connection, so as to generate said modified function value N'(f).

13. An admission controller for network access of claim 9, wherein the second calculation device subtracts 1 from the function value N(f) corresponding to cycle f, according to a cycle of the departing connection, so as to generate said modified function value N'(f).

* * * * *